July 23, 1935.    C. W. DAWSON    2,008,685
PRESSURE CONTROL APPARATUS
Original Filed April 4, 1928    5 Sheets-Sheet 3

Inventor
Charles W. Dawson
By Maréchal and Noe
Attorney

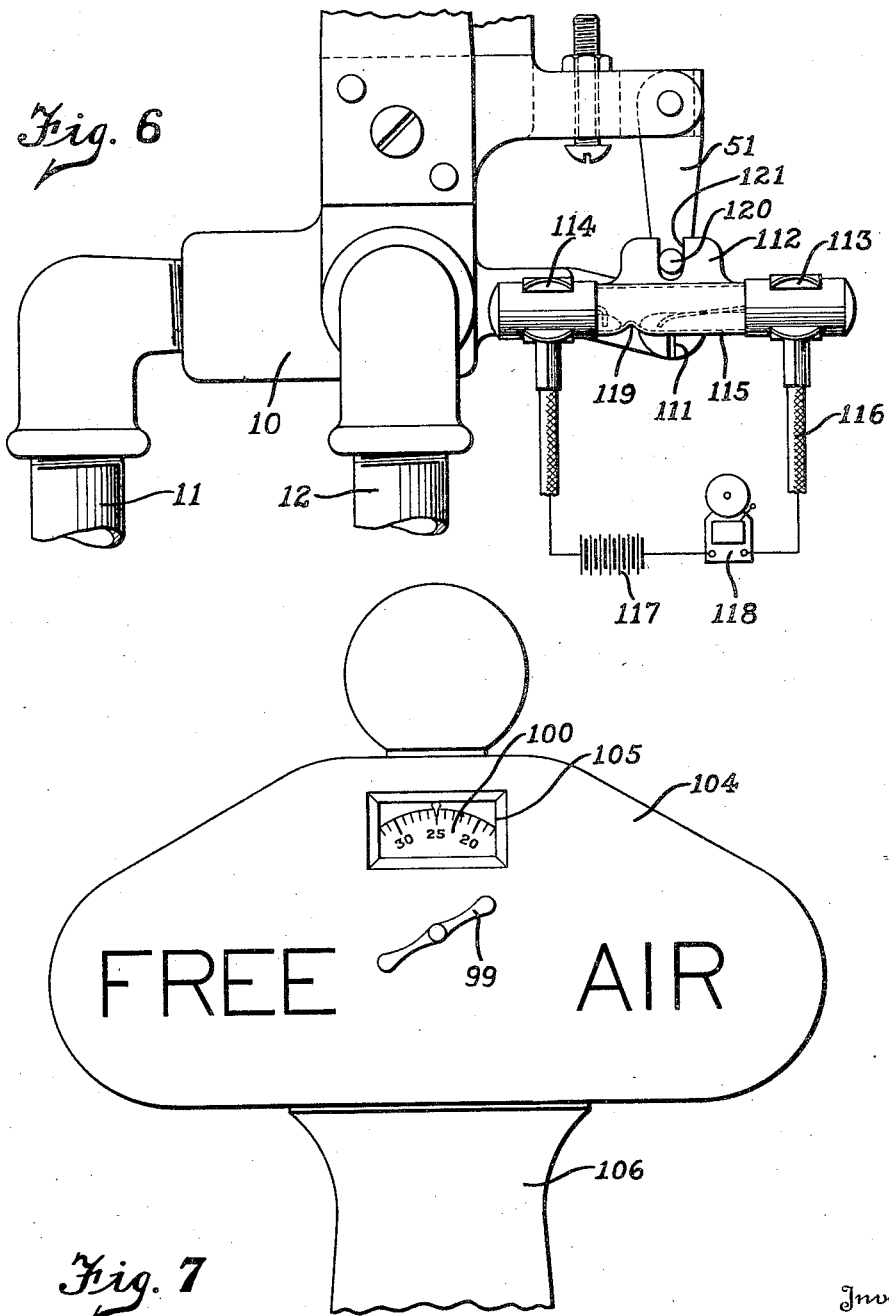

Patented July 23, 1935

2,008,685

UNITED STATES PATENT OFFICE 2,008,685

PRESSURE CONTROL APPARATUS

Charles W. Dawson, Dayton, Ohio

Application April 4, 1928, Serial No. 267,305
Renewed October 23, 1934

13 Claims. (Cl. 50—5)

This invention relates to apparatus for automatically controlling the pressure of fluid, either liquid or gaseous, and is particularly adapted for use in connection with apparatus employed for supplying air at definite pressures to automobile tires and the like.

One object of the invention is the provision of a dependable apparatus of this character which can be quickly set to produce a desired pressure, and having a valve automatically regulated in a novel manner so that the supply of fluid is cut off when the desired pressure is reached.

A further object is the provision of an apparatus of this character having provisions for maintaining the valve which controls the supply of fluid either fully opened or fully closed so that air may be rapidly supplied when the valve is fully opened and then quickly cut off when the desired pressure is attained.

Other objects and advantages of the invention will be apparent from the following description and from the accompanying drawings in which—

Figure 9:
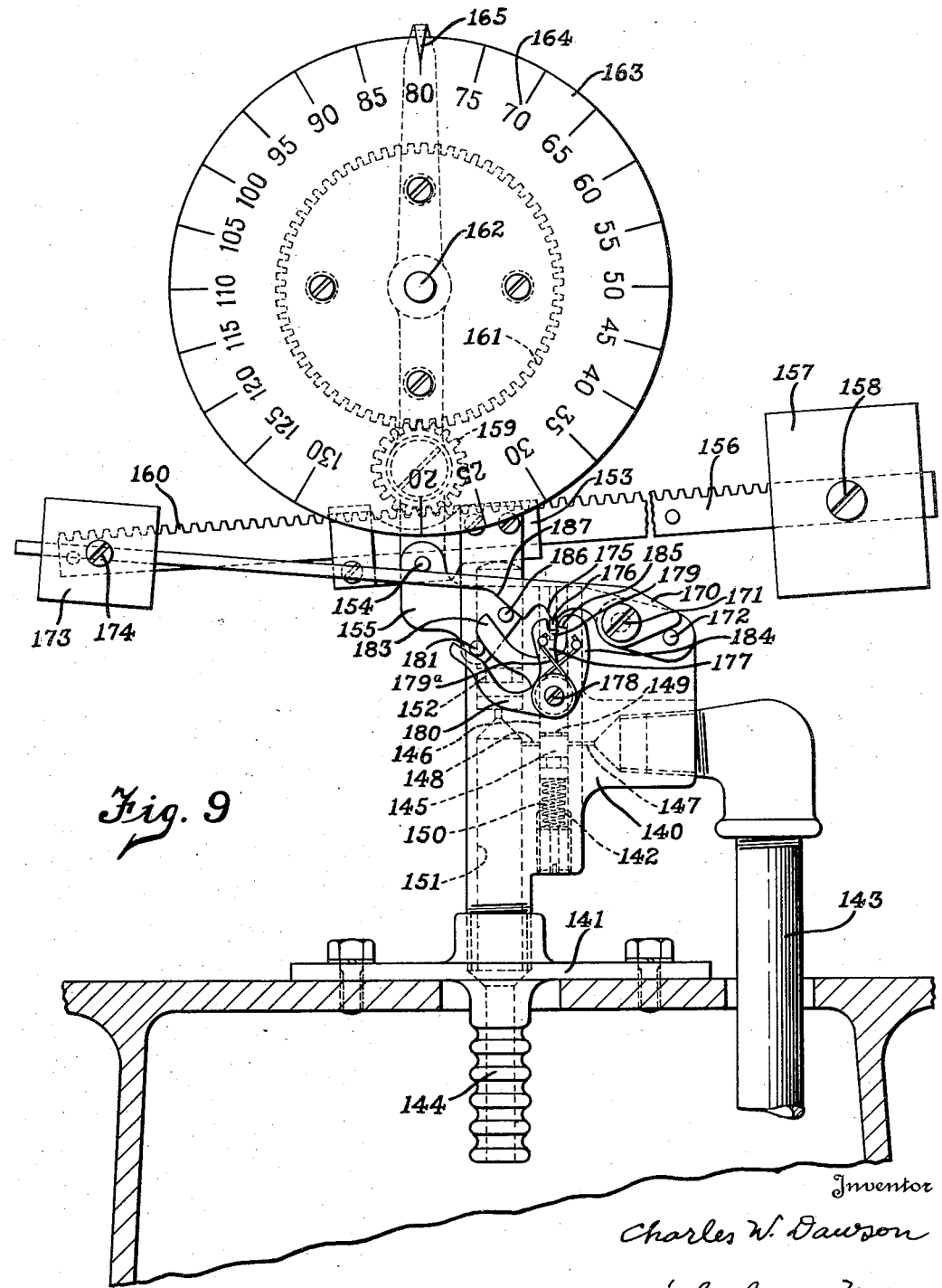

Fig. 5 is a detail front elevation of the holding and latching means, the parts being arranged so that the valve is just ready to open;

Fig. 6 is a rear elevation of the lower portion of the pressure-limiting apparatus, showing the circuit closer, the electrical circuit which it controls being shown diagrammatically;

Fig. 7 is a front elevation showing the pressure-limiting apparatus supported in an enclosing casing;

Fig. 8 is a vertical section through a modified form of a pressure-responsive means; and Fig. 9 is a front elevation of a modified form of construction, embodying the present invention.

Referring more particularly to the drawings, the present invention embodies a valve housing 10 to which inlet and outlet pipes or conduits 11 and 12 are connected. Two outlet pipes 12' and 12 are shown, one 12' connected to the rear of valve housing and another 12 to the bottom portion thereof, either of which may be used as desired to supply fluid at the proper pressure to a device to be supplied or inflated. The inlet pipe 11 leads to a suitable supply tank of fluid, the supply being maintained in any suitable manner at a pressure which is preferably substantially greater than the pressure to be supplied through the outlet pipe or pipes 12. The outlet pipe 12, in the embodiment of the invention herein disclosed is adapted to be connected to a suitable distributing hose having at its end the customary nipple valve. When the nipple valve is placed in position on the valve stem of the tire to be inflated to a definite air pressure it will be understood that the valve stem in the nipple valve is moved to open position so that the interior of the distributing hose is placed in communication with the tire. The apparatus of the present invention is designed to automatically supply air to the tire until the desired air pressure is attained, and then to cut off the supply of air by means of an automatically operated valve which controls communication between the inlet pipe 11 and the outlet pipe 12. This automatic valve, designated generally 14, preferably comprises a removable valve casing 15 which is threaded within the inlet passage of the valve housing. Within the casing 15 is the valve member 16, preferably of conical form so that it may seat within the aperture 17 at the end of the valve casing when the valve is in its closed position. A small compression spring 18 is preferably provided so as to exert a small force tending to close the valve. The valve member 16 is guided for reciprocatory movement within the cylindrical valve casing by means of a guide disk 19, this guide disk having cut-away peripheral portions providing free communication between opposite sides thereof. A retaining cap 20 is threaded within the end of the valve casing to form an abutment against which one end of the spring 18 presses. The entire valve assembly may be easily removed for the replacement either of the whole assembly, or of parts thereof. To maintain the valve member 16 centered within the valve casing the end of this member is extended to form a guide pin or stem 21, substantially smaller than the diameter of the orifice 17; and this guide pin is freely guided within the end of a plunger 22 which is mounted for reciprocatory movement in the valve housing. The hole in the end of this plunger is sufficiently long so that the conical member 16 may be pressed against the seat or orifice 17 by the spring 18 and by means of the pressure exerted on the inlet side of the valve, when the plunger 22 is in its retracted or outward position. When the plunger however is pressed towards the valve the guide pin 21 is moved toward the right, see Fig. 4, and the conical member 16 is thus forced away from its seat to place the inlet and outlet pipe in communication.

Figures 3, 4:
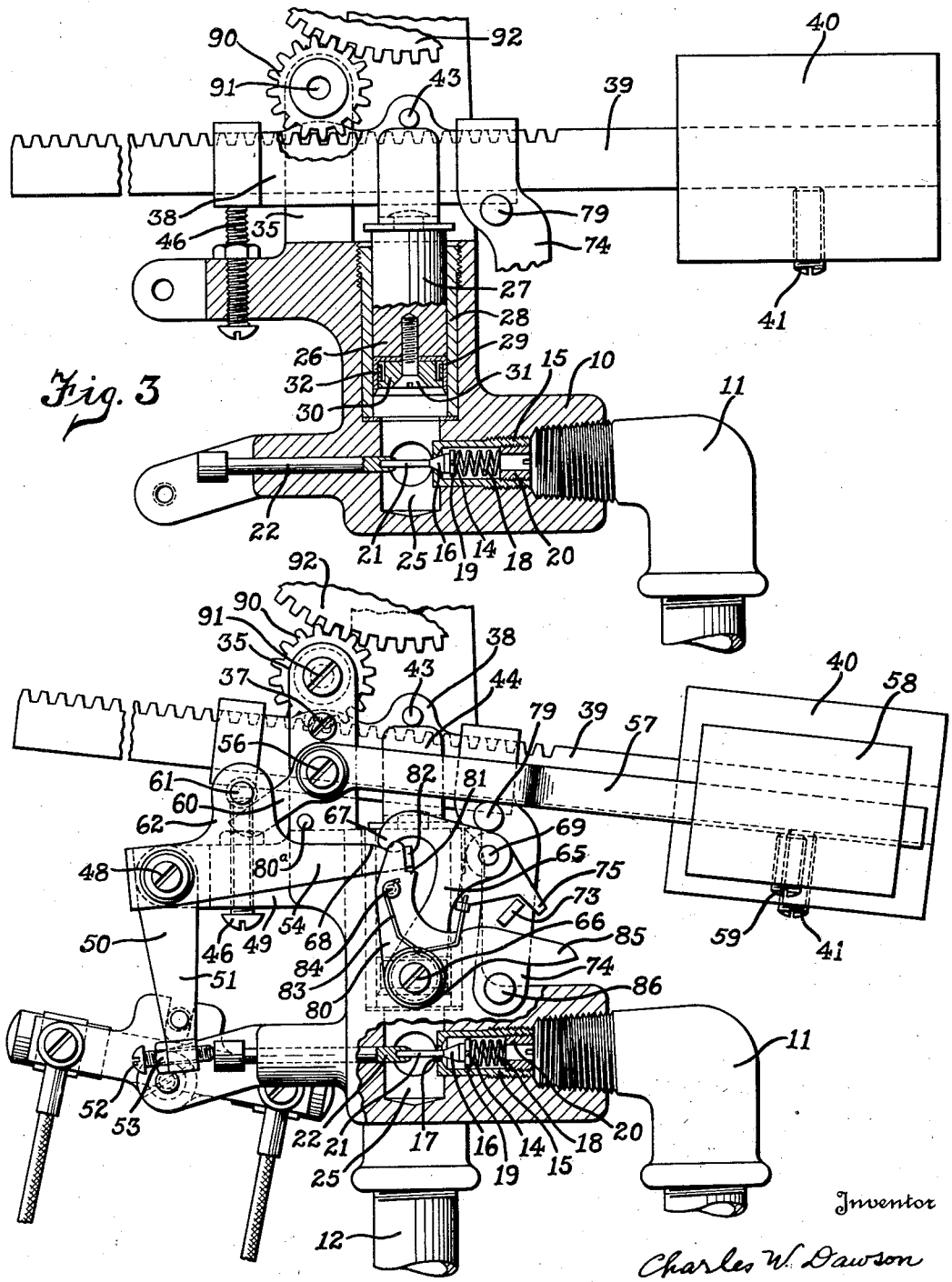
Fig. 3 is a front elevation of a portion of the apparatus shown in Fig. 1, partly in vertical section.
Fig. 4 is a front elevation showing the valve in section, the parts being positioned in valve-open position.

On the outlet side of the valve the valve housing is provided with a chamber 25, this chamber being in communication with the outlet pipe 12 at all times. Referring now to Fig. 3 it will be seen that the valve housing 10 is provided with a pressure-responsive means 26, herein shown as comprising a piston 27 reciprocally mounted in a bushing 28 which is threaded in a suitable recess at the upper end of the valve housing, so that it may be easily removed if desired. On the lower end of the piston is fastened a flexible washer 29 of leather or other suitable material having a cylindrical flange engaging the inside of the bushing 28 to prevent air from leaking between the bushing and the piston. The washer is held on the bottom of the piston by means of a retainer 30 through the center of which passes a retainer screw 31 which is threaded in the center of the piston. This retainer 30 is smaller in diameter at its upper portions than the inside distance across the washer flange so that space is provided within the washer flange for an expansible leaf spring 32 which is designed to press outwardly on the flange of the washer to maintain the washer against the inner cylindrical surface of the bushing 28. The lower end of the retainer 30 serves to retain the leaf spring 32 in position within the washer, this lower end being preferably square or triangular so that the inside of the washer adjacent the spring 32 is always in free communication and equalized with the pressure of the air below the piston. This piston is thus in communication with the chamber 25 so that the position of the piston will be governed by the pressure in the chamber.

Extending upwardly from the top of the valve housing 10 are a pair of supporting arms 35, between which extend pivot pins 37. These pivot pins pass through a fulcrum member or frame 38, in which is slidably mounted a rack bar or lever 39 having rack teeth for a purpose which will be presently described. The fulcrum frame is received between the two supporting arms 35 for pivotal or oscillatory movement about the pins 37, and as the rack bar 39 fits within the fulcrum frame with a running or sliding fit it will be understood that the rack is also mounted for pivotal movement about the pins 37. Carried on the outer end of the rack 39 is a weight 40, a screw 41 threaded in the weight being adapted to engage at its inner end with the bottom of the rack or lever 39 to hold the weight in a definite position thereon. The weight thus serves to normally hold the rack lever in the position shown in Fig. 4. In this position a stop pin 43 carried by the top of the fulcrum frame 38 rests on top of a bifurcated lug 44 the bifurcations of which slidingly embrace the fulcrum frame 38. The lower end of this lug 44 is connected to the top of the piston 27 so that as the piston is moved upwardly within the bushing 28 the engagement between the bifurcated lug 44 and the stop pin 43 will cause a corresponding movement of the weighted lever or rack 39 about its pivotal mounting. The weight, its supporting rack, and the fulcrum mounting together constitute a weighing means against which the pressure on the pressure-responsive means or piston is balanced, the pressure on the piston by reason of the compression of the air within the chamber 25 acting upwardly on the piston against the force of the weight 40. Normally the weight 40 acts to hold the piston down to a lowered position in the bushing when the valve 14 is closed. When the valve 14 is open and air is being rapidly supplied under considerable pressure to the chamber 25, the piston is forced upwardly so as to raise the weight until the weight assumes the position shown in Fig. 3, where the fulcrum frame 38 abuts against an adjustable stop screw 46 adjustably mounted at one side of the piston cylinder on the valve housing.

Figure 1:
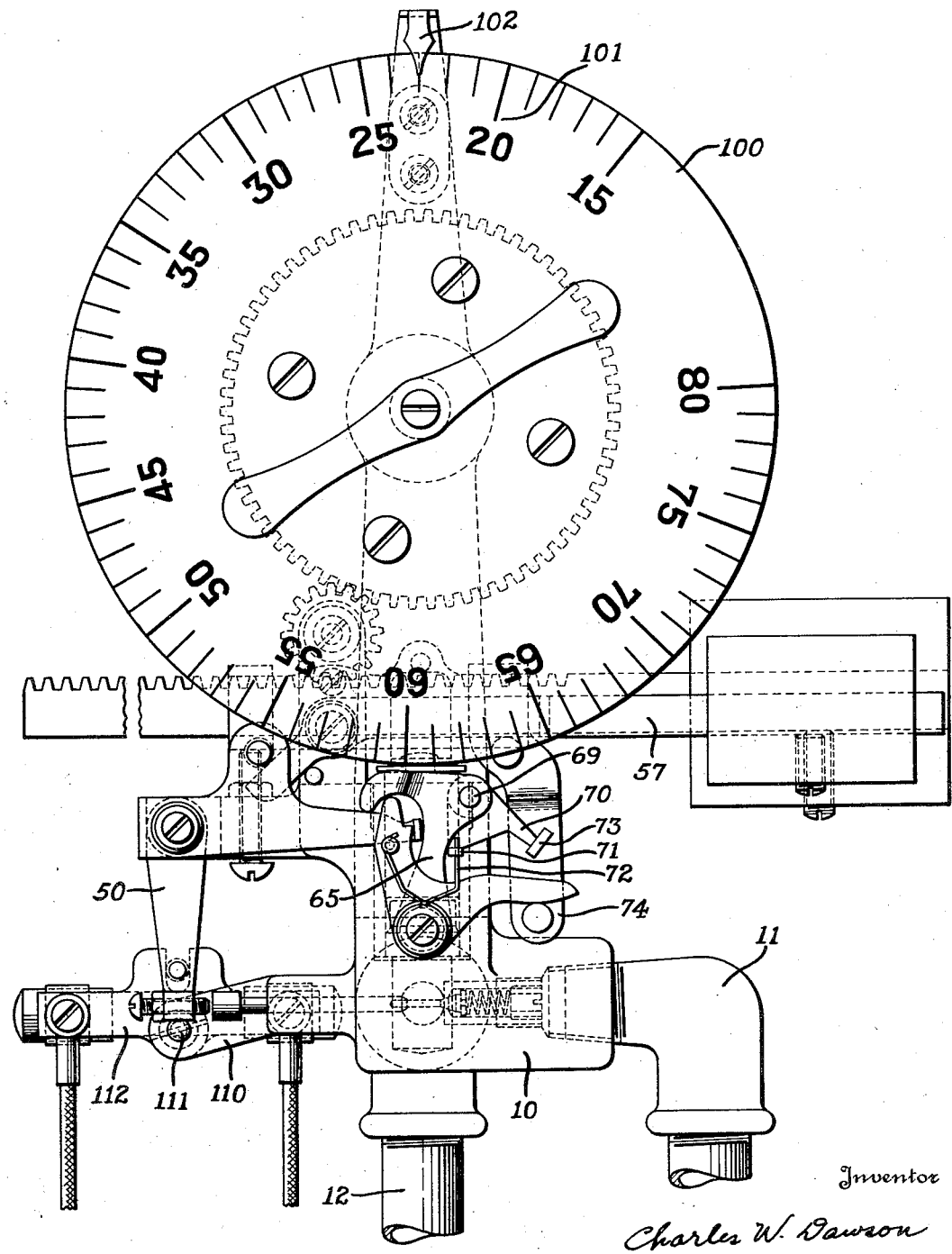
Fig. 1 is a front elevation of a pressure-limiting fluid-supply apparatus embodying the present invention, showing the parts in valve-closed position.
Figure 2:
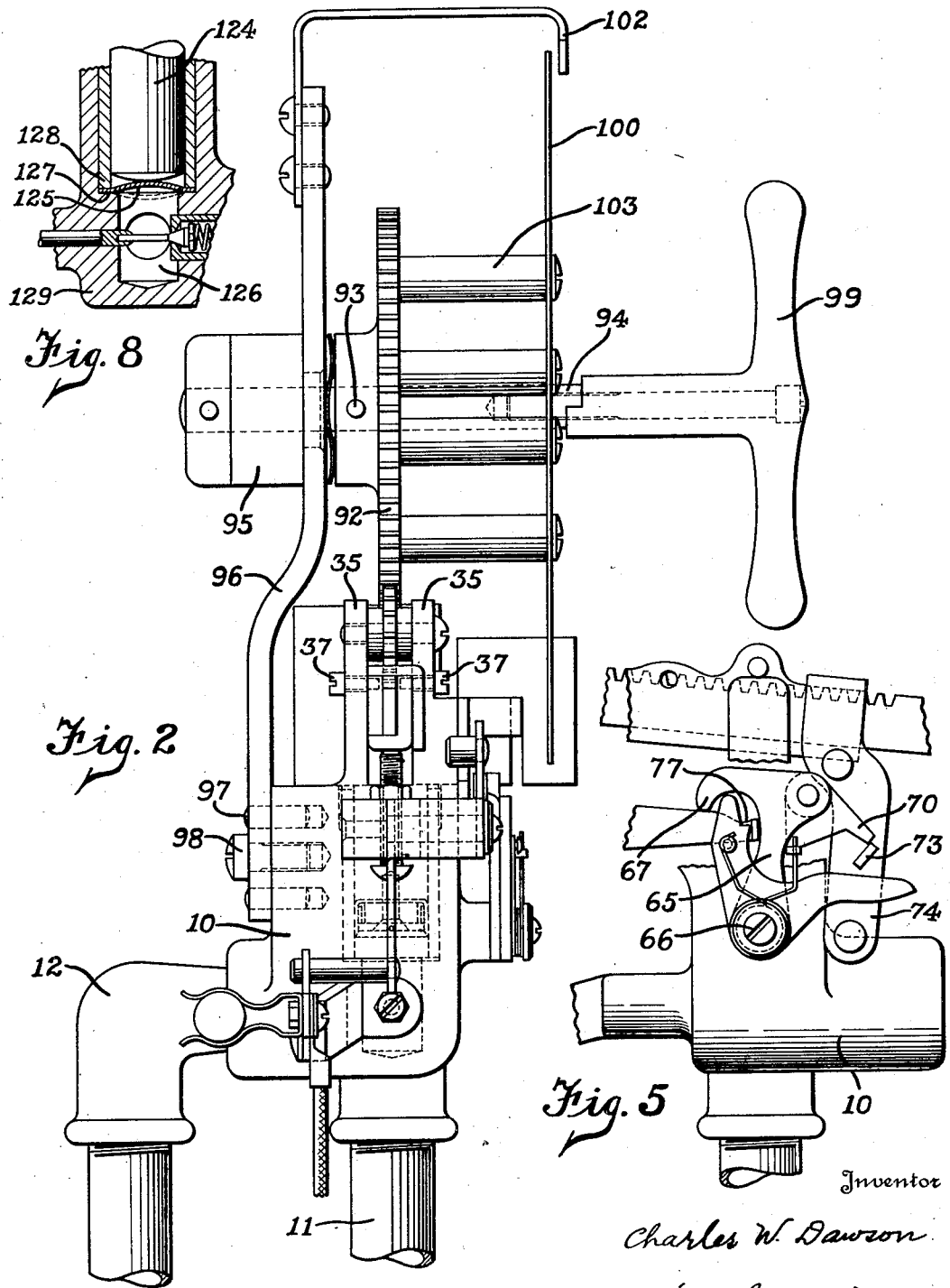
Fig. 2 is a side elevation of the apparatus shown in Fig. 1.

Pivotally mounted on a screw 48 in a bracket 49 of the valve housing is a bell-crank lever 50. This lever has a depending arm 51 which carries an adjustable set-screw 52 adapted to be locked in adjusted position by a lock nut 53. The end of this screw is adapted to engage the end of the plunger 22 which extends out beyond the valve housing as shown in Figs. 1 and 4. The lever 50 also embodies a horizontal arm 54 which is operated automatically to move the plunger 22 inwardly and unseat the valve member 16, or to release the plunger 22 so that the pressure of the air in the inlet side of the valve may cause the seating of the valve and the outward movement of this plunger.

Carried on a pivot pin 56 which projects from one of the supporting arms 35 is a pivoted weighted lever 57 which carries at its end a weight 58 adapted to be fastened in proper position by means of a set-screw 59. The lever 57 is provided with an arm 60 which extends from the fulcrum pin 56 in such a manner as to be engageable with a pin 61 provided on an upwardly extending ear 62 on the arm 54 of the bell-crank lever. When downward (clockwise) movement of the weighted member 57 is permitted it will be understood that the arm 60 pressing upwardly on the pin 61 causes the counterclockwise movement of the bell-crank lever to effect the opening of the valve. However holding means are provided to prevent the opening of the valve, and to prevent the weighted lever 57 from operating the bell-crank lever 50 until the weighted rack lever 39 and the pressure-responsive means 26 reach a normal position with the weight lowered and with the piston 27 at the lower end of its range of movement. This holding means comprises a pivoted holding lever 65 which is mounted for oscillatory movement on a fulcrum pin 66 which projects from the valve housing 10. This holding lever is provided with a nose 67 which rides on the upper surface 68 of the end of the arm 54 so that when the parts are in the position shown in Fig. 1 the movements of the bell-crank lever 50 in a direction to effect the opening of the valve, are prevented.

Pivoted on the holding lever 65 by means of a small pivot pin 69 is a small detent lever 70. This detent lever 70 has an outturned projection 71 which engages the intermediate portion of the lever 65 as shown in Fig. 1, the projection 71 being engaged by a wire spring 72 which exerts a pull on detent lever 70 and through the latter on the lever 65 tending to move them in a counterclockwise direction. Both the lever 65 and the detent lever 70 will be swung towards the left or counterclockwise when permitted to do so, but the spring held detent lever 70 at times is restrained by a detent 73 carried on a depending arm 74 which is rigid with the fulcrum frame or mounting 38 of the weighted rack lever. Referring now to Fig. 4 it will be seen that the detent 73 engages the end or tail 75 of the detent lever as the weighted rack and its fulcrum mounting are moved upwardly or counterclockwise about the pivot pin 37. During the upward movement of the weighted rack lever the detent lever 70 is swung about its pivotal mounting 69 and this prevents the spring 72 from exerting any pull upon the holding lever 65 so that this holding lever remains in the ineffective position shown in Fig. 4 until the detent 73 frees the detent lever. Fig. 5 shows the positions of the parts just after the detent frees the detent lever and here it will be noticed that the spring 72 has moved the holding lever 65 from the depression 77 in the end of the arm 54 to a higher position on the lever to one side of this depression, the arm 54 having been moved to lowered position, and the lever 65 thus holds the lever 54 in valve-closed position. The bell-crank lever 50 is held in valve-closed position now by the nose 67 engaging the upper side of the arm 54, the detent 73 effectively preventing clockwise movement of the holding lever 65. The detent 73 has an effective surface which is substantially a portion of an arc of which the pivotal fulcrum mounting 37 is the center, so that the detent, as shown in Fig. 1, is effective in holding lever 65 in holding position, the valve being closed. When the weighted rack lever 39 falls so that the detent 73 is clear of the end 75 of the detent lever the valve may be opened, and as the arm 54 of the bell-crank lever is moved upwardly the upper surface of the end of the arm 54 cams the holding lever 65 towards the right and the parts assume the position shown in Fig. 4.

The weighted member 57 is moved upwardly to a substantially horizontal position as shown in Fig. 1 by means of a pin or projection 79 provided on the depending arm 74 of the fulcrum frame 38. This pin 79 extends out beyond the lower surface of the weighted member 57 which is thus carried along with it to a raised position. A stop pin 80a fixed in position on one of the supporting arms 35 is preferably provided for limiting the upward movements of the weighted member 57 as shown in Fig. 1.

So far as the device has been explained the operation is as follows:

The distributing or outlet pipe 12 is placed in communication with the interior of the tire or other device to be pumped up, and initially having say thirty pounds per square inch pressure, and let us assume for example that the weighted arm 39 exerts a pressure on the top of the pressure-responsive means 26 to just balance a pressure of fifty pounds per square inch in the chamber 25. The chamber 25 being in communication with the interior of the tire at thirty pounds per square inch pressure, the weighted arm will be in its down position as shown in Fig. 4 since the pressure on the bottom of the pressure-responsive means is less than that required to balance the weight 40. In this position of the weight the detent 73 is in a position which does not interfere with the clockwise movement of the holding lever 65 and consequently the nose 67 of this lever may be received in the depression 77 of the bell-crank arm 54. The bell-crank lever has therefore assumed a valve-open position, the bell-crank having been moved in a counter-clockwise direction by the weighted member 57. The plunger 22 is in its depressed position holding the valve 14 open, and air is being supplied from the source or storage tank under high pressure to the chamber 25 and to the distributing pipe 12 connected to the tire. When the pressure within the chamber 25 reaches fifty pounds per square inch the pressure on the bottom of the piston 27 of the pressure-responsive means is sufficient to overcome the depressive force exerted by the weighted lever 39 and the piston rises to the position shown in Fig. 3, forcing the weight upwardly against the action of gravity about the fulcrum point 37. This movement of the lever 39 raises the weighted lever or member 57 along with it, since the pin 79 is below the bottom of this lever 57. The force of lever 57 on the pin 61 is thus removed. The upward movement of the detent 73 during this time has freed the holding member 65 so that this holding lever can assume the position shown in Fig. 4 corresponding to valve-open position. The valve is thus closed at a pressure of fifty pounds per square inch in the chamber 25.

To maintain the valve fully open until the desired pressure is attained in the chamber 25 a latch lever 80 is provided, this latch lever being preferably mounted on the same pin 66 on which the holding lever 65 is mounted. This latch lever 80 is provided with a latching surface 81 which engages the projecting end 82 of arm 54 of the bell-crank lever in the position of the parts shown in Fig. 4, so that clockwise movements of the bell-crank lever are prevented and the valve is held fully open until the latch lever is moved counter-clockwise to release the bell-crank lever. A wire spring 83 engages a stud 84 on the latch lever in such a way as to tend to cause clockwise rotation of the latch lever to latching position. This spring 83 may form a continuation of the spring 72 the two being ends of a one spring member which is wound about the pivot pin 66. Rigid with the latch lever 80 is a releasing tail or trigger arm 85. Below the trigger arm the depending arm 74 of the fulcrum mounting 38 is provided with an unlatching pin 86 projecting therefrom so as to engage the under side of the trigger arm 85 when the fulcrum mounting 38 has been moved a certain extent in a counter-clockwise direction from the position shown in Fig. 4. Fig. 1 shows the trigger arm moved by the unlatching pin 86 to release the latching surface and permit the clockwise movement of the bell-crank lever to permit the valve to close.

When pressure is being supplied through the outlet pipe 12 to a tire or other device to be inflated or to be supplied with air to a definite pressure of say fifty pounds per square inch, the fall in pressure of the air in the chamber 25 when the tire is first connected to the outlet pipe 12 permits the pressure-responsive means to be lowered, and the weight 40 falls. This releases the holding means, which up to this time has been maintaining the bell-crank lever 50 in such position as to permit the valve to remain closed. The release of the holding means permits the weighted member 57 to cause a counter-clockwise movement of the bell-crank lever to open the valve, the holding lever 65 during this operation being cammed towards the right where it is received in the recess 77 in the end of the arm 54. The valve is maintained in this position to permit an uninterrupted flow of air through the valve by the latching lever 80 which has been moved by its spring 83 as soon as the weight 40 was lowered and the unlatching pin 86 dropped below unlatching position. The pressure in the chamber 25 then builds up until it assumes the value of say fifty pounds per square inch. When this occurs the piston, moving upwardly, raises the weight 40 so that the lever 39 extends substantially horizontally in its elevated position. During the elevation of the weight 40 the valve is maintained in open position by the latch 60, and the weighted member 57 is being moved upwardly by the pin 79. At the same time the unlatching pin 86 is being brought into engagement with the trigger arm 85. When the arm 37 reaches the limit of its upward movement the following operations occur in rapid succession. The latching lever 60 is moved to unlatching position permitting the bell-crank lever 50 to move to valve-closed position. The detent 73 is freed from the tail of the detent lever so that the holding lever 65 moves in a counter-clockwise direction to holding position to maintain the valve closed, and prevent the weighted lever 57 from moving downwardly when the weighted lever 39 starts to move down. Due to the fact that the distribution or equalization of the pressure in the chamber 25 and in the tire cannot take place instantaneously the chamber 25 is rapidly supplied with air to attain the pressure of fifty pounds per square inch before the tire reaches this pressure. The valve is therefore automatically closed before the tire reaches the desired pressure. The air pressure then quickly equalizes, the pressure within the chamber 25 falling and the pressure-responsive means lowering to permit the downward movement of the weighted arm 39, which, when it reaches its downward limit of movement as shown in Fig. 4, releases the holding means which has been maintaining the valve closed, and the valve is again automatically opened. These operations take place in rapid succession the valve being maintained closed and maintained open during the time the weighted lever is moving from one extreme position to the other, and the movements of the valve are thus effected in a rapid manner to fully opened or fully closed positions. When the desired air pressure is reached in the tire and the tire as well as the chamber 25 has attained a pressure of fifty pounds per square inch the weighted arm 39 is held in its elevated position as the pressure-responsive means is maintained in its uppermost position, and the valve is thus maintained closed. The operator can then disconnect the end of the distributing hose from the tire and if this distributing hose is provided with the customary valve at the coupling end, the pressure of fifty pounds per square inch to which the device has previously been set is maintained in the chamber 25 and in the distributing hose, the apparatus being maintained in the position shown in Fig. 1. If the distributing hose leaks slowly and the pressure in the chamber 25 falls the valve would be automatically opened to supply air to this chamber until the pressure to which the device has been set is again attained.

It has been assumed that the weight of the arm 39 is sufficient to balance a pressure of fifty pounds per square inch in the chamber 25. However this figure has been used merely as an example, and it is intended that the lever 39 will constitute a weighing means so that any desired air pressure can be supplied from the pressure-limiting apparatus. As shown the upper side of the lever 39 is provided with rack gear teeth which are engaged by a pinion 90 rotatably mounted on a shaft 91 provided in the supporting arms 35. This pinion 90 is manually rotated by a master gear 92 which is fixed as by means of a pin 93 to a control shaft 94. This control shaft is rotatably mounted in a bearing 95 provided in an upstanding support bracket 96 fastened to the rear of the valve housing 10 as by means of suitable pins 97 and a screw 98. The control shaft 94 projects forwardly and has fixed to it a control handle 99. It will thus be apparent that the control handle may be manually rotated to move the master gear 92, and thereby rotate the pinion 90 to move the rack lever 39 in the direction of its length, and regulate the effective force of the weight 40 against the pressure-responsive means of the apparatus without interference with the parts controlled by the fulcrum mounting or frame 38. Preferably the gear 92 supports a rotatable dial 100 bearing suitable indications 101 which may show the number of pounds per square inch to which the apparatus is set, suitable supporting sleeves 103 serving to fasten the gear 92 and the dial 100 together. The dial markings cooperate with an index pointer 102 fixed to the upper portion of the support bracket 96. In the position of the apparatus shown in Fig. 1 the weight 40 and the rack lever 39 have been adjusted for a pressure of twenty-three pounds per square inch.

The pressure-limiting apparatus shown in Fig. 1 is preferably enclosed in a suitable casing 104 so that the dial 100 is visible through a window 105. The control handle 99 is positioned at the front of the casing where it may be easily accessible to the operator. As shown the casing 104 is mounted on a suitable pedestal 106.

The valve casing 10 is provided with a bracket 110 carrying a screw 111 on which is rotatably mounted a switch support. The switch support preferably comprises a strap 112 of insulating material having contact clips 113 and 114 adapted to receive the terminals of a glass tube 115 in which is a suitable quantity of mercury. The clips 113 and 114 are electrically connected by means of suitable wiring 116 in series with a battery 117 or other source of electrical energy, and a bell 118 which is adapted to give an audible indication when air is passing through the control valve, so that the operator may know that the device is functioning. When the glass tube 115 is horizontally positioned an upward bulge 119 in the lower side of the tube separates the mercury into two different pools and interrupts the flow of electricity from one contact terminal or clip to the other. This deenergizes the bell, and this position of the circuit controller corresponds to a valve-closed position, as shown. A pin 120 projecting from the rear of the depending arm 51 of the bell-crank lever, is received in a slot 121 in the strap 112 above its pivotal mounting, so that when the valve is moved to open position and the circuit closer tilted to the position shown in Fig. 4 the mercury can bridge the gap between the two pools while still maintaining contact with the terminal of the clip 113 to close the circuit through the bell and thus give an audible indication to the operator as long as the control valve is open. The operator will thus hear a series of rings one after the other as the device operates to supply air to a predetermined pressure to a tire or other apparatus, the rings stopping after the predetermined desired pressure is attained.

Fig. 8 represents a modified form of pressure-responsive means. In this form of construction the piston is replaced by a plunger member 124 the upper end of which is constructed similarly to the upper end of the piston 27 heretofore described. The bottom of the plunger 124 is preferably curved and rests against a flexible diaphragm 125 of rubber or other suitable material which is adapted to be flexed from the full line to the dotted line position and thus cause upward or downward movement of the plunger 124 as the pressure in the chamber 126 rises or falls. The diaphragm 125 is imperforate and is fixed at its terminal portions securely between a ledge 127 and the lower end of the bushing 128. This bushing is screwed into the upper portion of the valve housing 129 in the same manner as in the embodiment of the invention first described.

Fig. 9 illustrates a modified form of construction of the pressure-limiting apparatus. In principle however this modified construction is the same as in the form of my invention first described. As shown, the valve housing 140, mounted upon a support 141, is provided with a spring-pressed valve 142 adapted to control communication from the inlet pipe or conduit 143 to the outlet pipe 144. The valve 142 embodies a valve member or plunger 145 which slides within a cylindrical vertical hole 146 in the valve housing. The valve member 145 has a peripheral groove 149 adapted to register with the inlet passage 147 and the outlet passage 148 when the valve is in its lowered position and the spring 150 is compressed. When the valve is in its raised position as shown in this figure the peripheral groove 149 is out of registration of the inlet and outlet passages 147 and 148 and consequently at this time communication between these passages is interrupted, and the valve is closed. On the outlet side of the valve, the valve housing is provided with a chamber 151 in the upper end of which is a pressure-responsive member or piston 152 adapted to be raised by the pressure of the fluid within the chamber. The upper end of this piston 152 engages against the lower side of a fulcrum mounting 153 which is pivoted at 154 on a bracket 155 extending from the valve housing. Movably received within the fulcrum member 153 for movement in the direction of its length is a weighted lever 156 bearing at its end the weight 157. This weight is fastened in place on the end of the lever 156 by means of a suitable set screw 158. The upper end of the pressure-responsive means 152 thus balances against the downward force exerted by the weight on the pivoted arm 156. The position of the lever 156 is adapted to be regulated by means of a pinion 159 which engages the rack teeth 160 on the upper side of the lever, the pinion 159 being operated from the master gear 161 which is manually rotated by suitable rotational movements of the shaft 162 on which this gear is fixed. Carried by the gear is an indicating dial 163 bearing indications 164 adapted to cooperate with a fixed index 165.

Pivotally mounted on the valve housing is a weighted member 170 carried by means of a screw 171 on this housing. A stop pin 172 definitely limits clockwise movement of this member. Carried on the outer end of this member 170 is a weight 173 fixed by means of a set-screw 174. Weighted member 170 carries a projection 175 which bears against a square pin 176 carried by the upper end of the valve member 145 and projecting through a slot in the top of the valve housing. The weight on the member 170 is thus effective to cause downward movement of the pin 176 when permitted to do so to open the valve and establish communication between the inlet and outlet pipes. Downward movement of this pin 176 however is normally prevented by a holding means 177 which is pivoted on a pin 178 provided on the valve housing in such a manner as to cause a lip 179 on this holding means to be positioned below the pin 176, a spring 179a normally urging the holding lever 177 in a clockwise direction. Rigid with the holding means 177 is a detent arm 180 which is moved downwardly to retract the lip 179 from beneath the pin 176 by means of a pin 181 provided on the fulcrum mounting 153. This pin 181 is also engageable with a trigger arm 183 which is rigid with a latch 184 having a lip 185 adapted to be moved over the top of the square pin 176 to hold the valve in valve-open position.

When the weight 157 is elevated by the pressure within the chamber 151, effective through the pressure-responsive means, a pin 186 on the fulcrum mounting 153 engages a cam surface 187 on the weighted member 170 to raise this part to the position shown in Fig. 9. The same movement causes a counter-clockwise movement of the fulcrum mounting 153 and the pin 181 therefore releases the detent arm 180 so that the holding means 177 may be moved to holding position to maintain the valve closed. The upward movement of the pin 181 was also effective against the trigger arm 183 to swing the latch lever 184 away from a latching position above the square pin 176 and thus permit the valve to be closed by the pressure of the valve spring.

It will be apparent that the operation of this modified form of construction is substantially the same as for the form of construction first described. The valve is maintained fully opened or fully closed by means of the latch lever and the holding means respectively until the weighted lever 156 substantially reaches the ends of its normal range of movement about its pivotal support, and the valve is then quickly adjusted and maintained in its adjusted position until again operated by a reverse movement of the weighting means.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a pressure-limiting fluid-supply apparatus, a housing having inlet and outlet fluid conduits, a valve adapted to control communication between said inlet and outlet conduits, said housing having a chamber on the outlet side of said valve, pressure-responsive means adapted to be automatically positioned in accordance with the fluid pressure in said chamber, a weighted lever restraining the movements of said pressure-responsive means, manually operated mechanism for adjusting the effect of said weighted lever on said pressure-responsive means, a weighted member, an operable connection between said member and said valve, holding means for preventing operation of said connection by said weighted member, and an operable connection between said holding means and said weighted lever for quickly releasing the holding means at a predetermined pressure in said chamber, means controlled by said weighted lever for latching said operating connection in valve-open position until the pressure in said chamber rises to an amount slightly greater than said predetermined pressure.

2. In a pressure-limiting fluid-supply apparatus, inlet and outlet fluid conduits, a valve adapted to control communication between said inlet and outlet conduits, pressure-responsive means adapted to be positioned in accordance with the fluid pressure on the outlet side of said valve, a gravity member restraining the movements of said pressure-responsive means, manually operated mechanism for adjusting the effect of said gravity member on said pressure-responsive means, a pivoted member, an operable connection between said pivoted member and said valve, holding means for preventing operation of said pivoted member, and a detent on said gravity member for releasing the holding means at a predetermined position of said gravity member, means controlled by said gravity member for holding said operating connection in valve-open position until the pressure on the outlet side of the valve rises to a predetermined amount, said last means comprising a pivoted latch movable to latching position to prevent closing movements of the valve, a trigger arm carried by said latch, and a projection on said gravity member engageable with said trigger arm to release said latch when the gravity member attains a predetermined positioning at the end of its movement.

3. In a pressure-limiting fluid-supply apparatus, inlet and outlet fluid conduits, a valve adapted to control communication between said inlet and outlet conduits, pressure-responsive means adapted to be positioned in accordance with the fluid pressure on the outlet side of said valve, a weighted lever for restraining the movements of said pressure-responsive means, a manually operated mechanism for adjusting the effect of said weighted lever on said pressure-responsive means, a pivotally mounted weighted member, an operable connection between said weighted member and said valve, holding means for preventing operation of said weighted member, a detent on said weighted lever for releasing the holding means at a predetermined position of said weighted lever, means controlled by said weighted lever for holding said operating connection in valve-open position until the pressure on the outlet side of the valve rises above a predetermined value, said last-named means comprising a pivoted latch movable to latching position to prevent closing movements of the valve, a trigger arm carried by said latch, and a projection on said weighted lever engageable with said trigger arm to release said latch when the weighted lever reaches the limit of its downward movement.

4. In a pressure-limiting fluid-supply apparatus, a housing having inlet and outlet fluid conduits, a valve adapted to control communication between said inlet and outlet conduits, pressure-responsive means adapted to be automatically positioned in accordance with the fluid pressure on the outlet side of the valve, a weighted lever restraining the movements of said pressure-responsive means, said lever comprising a rack bearing a weight at one end, a fulcrum mounting for said rack in which said rack is slidably mounted, a manually operated gear engaging said rack for adjusting the effective length of said lever, and means carried by said fulcrum mounting for quickly moving said valve to fully open and fully closed positions at the limits of movement of said lever.

5. A pressure limiting fluid supply apparatus including a casing having an inlet and an outlet, a valve in said casing for controlling the flow of fluid through said casing, means for locking said valve in the fully open position, means for locking said valve in the fully closed position, a pressure responsive device including a reciprocating member, means movable with said reciprocating member and operable at one end of the stroke of said reciprocating member for releasing said first named locking means and means movable with said reciprocating member and operable at the other end of the stroke of said reciprocating member for releasing the second named locking means, means for quickly opening said valve upon the release of said first mentioned locking means and means for quickly closing said valve upon the release of said second named locking means.

6. A pressure limiting fluid supply apparatus including a casing having an inlet and an outlet, a valve in said casing for controlling the flow of fluid through said casing, means for locking said valve in the fully open position, means for locking said valve in the fully closed position, a pressure responsive device including a reciprocating member, means movable with said reciprocating member at one end of the stroke of said reciprocating member for releasing said first named locking means and means movable with said reciprocating member and operable at the other end of the stroke of said reciprocating member for releasing said second named locking means, means for quickly opening said valve upon the release of said first mentioned locking means and means for quickly closing said valve upon the release of said second named locking means and means for adjusting the effect of said pressure responsive means whereby the pressure at which said valve will open and close may be varied.

7. A pressure limiting fluid supply apparatus including a casing having an inlet and an outlet, a valve in said casing for controlling the flow of fluid through said casing, means for locking said valve in the fully open position, means for locking said valve in the fully closed position, a pressure responsive device including a reciprocating member, means movable with said reciprocating member and operable at one end of the stroke of said reciprocating member for releasing said first named locking means and means movable with said reciprocating member and operable at the other end of the stroke of said reciprocating member for releasing the second named locking means, means for quickly opening said valve upon the release of said first mentioned locking means and means for quickly closing said valve upon the release of said second named locking means and means for adjusting the effect of said pressure responsive means whereby the pressure at which said valve will open and close may be varied and means for regulating the degree of opening of said valve.

8. A pressure limiting fluid supply apparatus including a casing having an inlet and an outlet, a valve in said casing for controlling the flow of fluid through said casing, means for locking said valve in the fully open position, means for locking said valve in the fully closed position, a pressure responsive device including a reciprocating member, means movable with said reciprocating member and operable at one end of the stroke of said reciprocating member for releasing said first named locking means and means movable with said reciprocating member and operable at the other end of the stroke of said reciprocating member for releasing the second named locking means, means for quickly opening said valve upon the release of said first mentioned locking means and means for quickly closing said valve upon the release of said second named locking means, an electric circuit containing a signaling device, a circuit closer on said apparatus, and means for automatically operating said circuit closer to make and break the electric circuit as the valve moves to open and closed positions.

9. A pressure limiting fluid supply apparatus including means for controlling the supply of fluid, means for locking said controlling means in the fully open position, means for locking said controlling means in the fully closed position, a pressure responsive device including a reciprocating member, means movable with said reciprocating member and operable at one end of the stroke of said reciprocating member for releasing said first named locking means and means movable with said reciprocating member and operable at the other end of the stroke of said reciprocating member for releasing said second named locking means, means for quickly opening said control means upon the release of said first mentioned locking means and means for quickly closing said control means upon the release of said second named locking means.

10. A pressure limiting fluid supply apparatus including means for controlling the supply of fluid, means for locking said control means in the fully open position, means for locking said control means in the fully closed position, a pressure responsive device including a reciprocating member, means movable with said reciprocating member and operable at one end of the stroke of said reciprocating member for releasing said first named locking means and means movable with said reciprocating member and operable at the other end of the stroke of said reciprocating member for releasing said second named locking means, means for quickly opening said control means upon the release of said first mentioned locking means and means for quickly closing said control means upon the release of said second named locking means and means for adjusting the effect of said pressure responsive means whereby the pressure at which said control means will open and close may be varied.

11. A pressure limiting fluid supply apparatus including a means for controlling the supply of fluid, means for locking said control means in the fully open position, means for locking said control in the fully closed position, a pressure responsive device including a reciprocating member, means movable with said reciprocating member and operable at one end of the stroke of said reciprocating member for releasing said first named locking means and means movable with said reciprocating member and operable at the other end of the stroke of said reciprocating member for releasing the second named locking means, means for quickly opening said control means upon the release of said first mentioned locking means and means for quickly closing said control means on the release of said second named locking means and means for adjusting the effect of said pressure responsive means whereby the pressure at which said control means will open and close may be varied and means for regulating the degree of opening of said control means.

12. A pressure limiting fluid supply apparatus including means for controlling the supply of fluid, means for locking said control means in the fully opened position, means for locking said control means in the fully closed position, a pressure responsive device including a reciprocating member, means movable with said reciprocating member and operable at one end of the stroke of said reciprocating member for releasing said first named locking means and means movable with said reciprocating member and operable at the other end of the stroke of said reciprocating member for releasing the second named locking means, means for quickly opening said control means upon the release of said first mentioned locking means and means for quickly closing said control means upon the release of said second named locking means, an electric circuit containing a signaling device, a circuit closer on said apparatus, and means for automatically operating said circuit closer to make and break the electric circuit after the control means moves to the opened and closed position.

13. A pressure limiting fluid supply apparatus including means for controlling the supply of fluid, a pressure responsive device, an operable connection between said pressure responsive device and said controlling means for quickly actuating said control means in one direction when the pressure reaches a predetermined value and quickly actuating said control means in the other direction when another predetermined pressure value is reached, locking means for positively preventing the actuation of said control means in said one direction until said predetermined pressure value is reached, locking means for positively preventing the actuation of said controlling means in said other direction until said other predetermined pressure value is reached, and means movable with said pressure responsive device for unlocking said first mentioned locking means, and means movable with said pressure responsive device for unlocking said second named locking means.

CHARLES W. DAWSON.